(12) United States Patent
Wang et al.

(10) Patent No.: US 9,201,636 B2
(45) Date of Patent: Dec. 1, 2015

(54) METHOD FOR DIVERGENCE ANALYSIS OF POINTER-BASED PROGRAM

(71) Applicant: NATIONAL TSING HUA UNIVERSITY, Hsinchu (TW)

(72) Inventors: Shao Chung Wang, Hsinchu (TW); Jenq Kuen Lee, Hsinchu (TW)

(73) Assignee: NATIONAL TSING HUA UNIVERSITY, Hsinchu (TW)

(*) Notice: Subject to any disclaimer, the term of this patent is extended or adjusted under 35 U.S.C. 154(b) by 257 days.

(21) Appl. No.: 14/086,481

(22) Filed: Nov. 21, 2013

(65) Prior Publication Data
US 2015/0143349 A1 May 21, 2015

(51) Int. Cl.
*G06F 9/45* (2006.01)

(52) U.S. Cl.
CPC ........................ *G06F 8/434* (2013.01)

(58) Field of Classification Search
None
See application file for complete search history.

(56) References Cited

U.S. PATENT DOCUMENTS

| | | | |
|---|---|---|---|
| 7,155,704 B2* | 12/2006 | Williams | G06F 9/52 717/127 |
| 7,284,219 B1* | 10/2007 | Manaker, Jr. | G06F 17/504 716/108 |
| 7,477,255 B1 | 1/2009 | Lindholm et al. | |
| 7,619,628 B2* | 11/2009 | White | G06T 1/60 345/501 |
| 7,834,881 B2 | 11/2010 | Liu et al. | |
| 7,996,798 B2* | 8/2011 | Srinivasan | G06F 17/504 716/103 |
| 8,161,464 B2* | 4/2012 | Archambault | G06F 8/4442 717/140 |
| 8,302,085 B2* | 10/2012 | Schellekens | G06F 11/3447 717/131 |
| 8,381,203 B1* | 2/2013 | Beylin | G06F 8/458 717/149 |
| 8,402,444 B2* | 3/2013 | Ball | G06F 8/43 717/124 |
| 8,881,293 B1* | 11/2014 | Brucker | G06F 21/577 717/126 |
| 2007/0240137 A1* | 10/2007 | Archambault | G06F 8/4442 717/140 |
| 2008/0091697 A1* | 4/2008 | Cui | G06F 12/0253 707/101 |
| 2008/0184208 A1* | 7/2008 | Sreedhar | G06F 21/577 717/128 |
| 2008/0295058 A1* | 11/2008 | Srinivasan | G06F 17/504 716/104 |
| 2009/0217248 A1* | 8/2009 | Bently | G06F 8/433 717/132 |

FOREIGN PATENT DOCUMENTS

| | | |
|---|---|---|
| TW | 200709055 | 3/2007 |
| TW | 201342212 | 10/2013 |

OTHER PUBLICATIONS

Notice of allowance and Search Report dated Jun. 29, 2015 from the Taiwan counterpart application 103122208.
English translation of the Search Report dated Jun. 29, 2015 from the Taiwan counterpart application 103122208.
English abstract translation of TW 201342212.
English abstract translation of TW 200709055.

* cited by examiner

*Primary Examiner* — Don Wong
*Assistant Examiner* — Roberto E Luna
(74) *Attorney, Agent, or Firm* — WPAT, P.C.; Anthony King (57) ABSTRACT

A method comprises generating an intermediate representation of a pointer-based program; providing a control flow graph of the intermediate representation; selecting an analysis candidate from the intermediate representation as a traced variable and a root node; determining a definition site of the trace variable according to a use-define chain and the control flow graph; defining a node for each definition site variable; defining an edge by using each definition site variable and the traced variable; using each definition site variable of the definition site as a traced variable; repeating the steps of determining a definition site, defining a node, defining an edge and using each definition site to obtain a divergence relation graph; transforming the divergence relation graph into a directed acyclic graph; and determining whether the analysis candidate is divergent or not according to a divergent node and the directed acyclic graph.

16 Claims, 11 Drawing Sheets

```
__kernel void foo(int *a, int *b
                  , int c){
1:   int tid = get_global_id(0);
2:   int *p, x=1, i=tid;
3:
4:   if( c > 100)
5:      p = b;
6:   else
7:      p = &a[tid];
8:
9:   while( i < 256){
10:     x = x + 1;
11:     i = i + 1;
12:  }
13:
14:  *p = x;
15:
16:  return;
   }
```

FIG. 1A

```
__kernel void foo(int *a₁, int *b₁
                  , int c₁){
1:   int tid₁ = get_global_id(0);
2:   int *p₁, x₁=1, i₁=tid₁;
3:
4:   if( c₁ > 100)
5:      p₂ = b₁;
6:   else
7:      p₃ = &a₁[tid₁];
8:   p₄ = φ(p₂, p₃);
9:
10:  i₂ = φ(i₁, i₃);
11:  x₂ = φ(x₁, x₃);
12:  while( i₂ < 256){
13:     x₃ = x₂ + 1;
14:     i₃ = i₂ + 1;
15:  }
16:  x₄ = φ(x₂, x₃);
17:  i₄ = φ(i₂, i₃);
18:
19:  *p₄ = x₄;
20:
21:  return;
   }
```

FIG. 1B

```
__kernel void foo(int *a₁, int *b₁
                  , int c₁){
1:   int tid₁ = get_global_id(0);
2:   int *p₁, x₁=1, i₁=tid₁;
3:
4:   if( c₁ > 100)
5:      p₂ = b₁;
6:   else
7:      p₃ = &a₁[tid₁];
8:   p₄ = φ(p₂, p₃);
9:
10:  i₂ = φ(i₁, i₃);
11:  x₂ = φ(x₁, x₃);
12:  while( i₂ < 256){
13:     x₃ = x₂ + 1;
14:     i₃ = i₂ + 1;
15:  }
16:  x₄ = φ(x₂, x₃);
17:  i₄ = φ(i₂, i₃);
18:
19:  *p₄ = x₄;
        a₂ = χ(a₁);
        b₂ = χ(b₁);
20:
        μ(a₂);
        μ(b₂);
21:  return;
   }
```

FIG. 1C

```
__kernel void foo(int *a₁, int *b₁
                  , int c₁){
1:   int tid₁ = get_global_id(0);
2:   int *p₁, x₁=1, i₁=tid₁;
3:
4:   if( c₁ > 100)
5:      p₂ = b₁;
6:   else
7:      p₃ = &a₁[tid₁];
8:   p₄ = γ(c₁ > 100, p₂, p₃);
9:
10:  i₂ = φ(i₁, i₃);
11:  x₂ = φ(x₁, x₃);
12:  while( i₂ < 256){
13:     x₃ = x₂ + 1;
14:     i₃ = i₂ + 1;
15:  }
16:  x₄ = γ(i₂ < 256, x₂, x₃);
17:  i₄ = γ(i₂ > 256, i₂, i₃);
18:
19:  *p₄ = x₄;
        a₂ = χ(a₁);
        b₂ = χ(b₁);
20:
        μ(a₂);
        μ(b₂);
21:  return;
   }
```

Algorithm 1: PDA($u_0$, *CFG*, *SSA*)

Input: An analysis candidate: $u_0$. A CFG: *CFG* of an analysis program. A SSA form: *SSA* of an analysis program.

Result: A directed acyclic graph: $G' = (V', E')$.

Global Data: A CFG: *CFG*, a SSA form: *SSA*, and a DRG: $G = (V, E)$. The statements of the *CFG* : *S*.

1 begin
2    $V = V \cup \{u_0\}$ ;
3    BuildDRG($u_0$) ; // Updates $G$
4    RemoveCycle($G$) ;
5    return DivergenceState($u_0$) ;
6 end

FIG. 3

```
Algorithm 2: BuildDRG(u)
  Input: u is a traced pointer or variable.
  Result: The DRG: G = (V, E) is generated by updating the global G itself.
  Used Data: The global data in PDA().
1 begin
2   if u is visited then return;
3   Set u visited;
4   Follow the use-def chain of u in SSA, and find the def-site of u: s ∈ S;
5   if type of (s) = χ annotation then BuildDRG_Chi(u,s);
6   else if type of (s) = gating function then BuildDRG_Gating(u);
7   else if s ≠ NULL then
8       switch (s) do
9           case Points-to Location                    // p = &v; ..
10              E = E ∪ {(u, u_rb)} ; | u_rb ∈ base address at RHS of s ;
11              V = V ∪ {u_rb} ;
12              E = E ∪ {(u, u_offset)} ; | u_offset is offset at RHS of s ;
13              V = V ∪ {u_offset} ;
14              Set the variance state of u_rb and u_offset are non-variant ;
15              BuildDRG(offset) ;
16          case Pointers Aliased                      // p = q + (affine-offset); ..
17              E = E ∪ {(u, u_rb)} ; | u_rb ∈ aliased pointer at RHS of s ;
18              V = V ∪ {u_rb} ;
19              E = E ∪ {(u, u_offset)} ; | u_offset is offset at RHS of s ;
20              V = V ∪ {u_offset} ;
21              Set the variance state of u_rb and u_offset are non-variant ;
22              BuildDRG(u_rb) ;
23              BuildDRG(offset) ;
24              break ;
25          case Updated by Function                   // i = get_global_id(0); ..
26              BuildDRG_Callee(u,s) ;
27              break ;
28          case Indirect Load                         // p = *q; ..
29              BuildDRG_Mu(u,s) ;
30              break ;
31          otherwise                                  // scalar variable assignments
32              foreach u_op ∈ operands in RHS of s do
33                  E = E ∪ {(u, u_op)} ;
34                  V = V ∪ {u_op} ;
35                  Set the variance state of u_op is non-variant BuildDRG(u_op) ;
36              end
37          end
38      end
39  end
40  return;
41 end
```

FIG. 4

Algorithm 3: BuildDRG_Chi($u, s$)

Input: $u$ is a traced pointer, and $s \in S$.
Result: Update the DRG: $G = (V, E)$ in *BuildDRG function*.

1 begin
2     $u_{md}$ = the dereference pointer of the indirect store pointer in $s$;
3     $E = E \cup \{(u, u_{md})\}$ ;
4     $E = E \cup \{(u, u_\chi)\}$ ; // $u_\chi \in$ operand in $\chi$
5     $V = V \cup \{u_{md}\}$ ;
6     $V = V \cup \{u_\chi\}$ ;
7     Set the variance state of $u_{md}$ and $v_\chi$ are non-variant ;
8     BuildDRG($u_{md}$) ;
9     BuildDRG($u_\chi$) ;
10     foreach $u_{op} \in$ *operands in RHS of s* do
11         $E = E \cup \{(u, u_{op})\}$ ;
12         $V = V \cup \{u_{op}\}$ ;
13         BuildDRG($u_{op}$) ;
14     end
15 end

FIG. 5

Algorithm 4: BuildDRG_Gating($u$)

Input: $u$ is a traced pointer or variable.
Result: Update the DRG: $G = (V, E)$ in *BuildDRG function.*

1 begin
2    foreach $u_{gating} \in operands$ *in* $\gamma$ *or* $\phi$ do
3       $E = E \cup \{(u, u_{gating})\}$ ;
4       $V = V \cup \{u_{gating}\}$ ;
5       Set the variance state of $u_{gating}$ is non-variant ;
6       BuildDRG($u_{gating}$) ;
7    end
8 end

FIG. 6

Algorithm 5: BuildDRG_Callee($u, s$)

Input: $u$ is a traced pointer or variable, and $s \in S$.
Result: Update the PRG: $G = (V, E)$ in *BuildDRG function*.

1 begin
2   if *the built-in function* $\in$ *Table 1* then
3     Set the variance state of $u$ is variant ;
4     return ;
5   end
6   else
7     $u_{rv} \in$ return value of callee in $s$ ;
8     $E = E \cup \{(u, u_{rv})\}$ ;
9     $V = V \cup \{u_{rv}\}$ ;
10     Set the variance state of $u_{rv}$ is non-variant ;
11     BuildDRG($u_{rv}$) ;
12   end
13 end

FIG. 7

Algorithm 6: BuildDRG_Mu(u, s)

Input: u is a traced pointer, and s ∈ S.
Result: Update the DRG: G = (V, E) in BuildDRG function.

1 begin
2    foreach $u_\mu \in$ operands in $\mu$ is associated with the statement, s do
3       $E = E \cup \{(u, u_\mu)\}$;
4       $V = V \cup \{u_\mu\}$;
5       Set the variance state of $u_\mu$ is non-variant ;
6       BuildDRG($u_\mu$);
7    end
8 end

Algorithm 7: RemoveCycle(G)

Input: A DRG: $G = (V, E)$ is produced by *BuildDRG*.
Result: A directed weighted cyclic graph: $G' = (V', E')$.
Local Data: $C$ = the cycles in $G$.

1 begin
2   foreach cycle $\in C$ do
3     foreach $u_0$ is the root $\in$ cycle do
4       while $u_i \neq \emptyset$ do     // $u_i$ is adjacent to $u_0$ and $u_i \in$ cycle
5         foreach $u_k \mid u_j$ is adjacent to $u_i$, $u_i$ is adjacent to $u_k$, $u_k \neq u_0$
        do
6           if $u_j \neq u_0$ then $E = E \cup \{(u_k, u_j)\}$;
7           $E = E - \{(u_k, u_i)\}$;
8         end
9         foreach $u_j$ do
10           if $u_j \neq u_0$ then $E = E \cup \{(u_0, u_j)\}$;
11           $E = E - \{(u_i, u_j)\}$;
12           $E = E - \{(u_0, u_i)\}$;
13         end
14         $u_0$'s divergent state = $u_0$'s divergent state $\cup$ $u_i$'s divergent state ;
15         $V = V - \{u_i\}$
16       end
17     end
18   end
19 end

FIG. 10

Algorithm 8: DivergenceState(u)

Input: Query the divergent state of variable $u$ and the DRG: $G = (V, E)$ is produced by *ReduceGraph*.

Result: the divergent state of variable $u$.

1 begin
2     state = the divergent state of $u$ ;
3     foreach $u_i$ *is adjacent to* $u$ do   state = state | DivergenceState($u_i$) ;
4     return state ;
5 end

FIG. 11

METHOD FOR DIVERGENCE ANALYSIS OF POINTER-BASED PROGRAM

BACKGROUND OF THE INVENTION

1. Field of the Invention

The present invention relates to a computer-implemented divergence analysis method for a pointer-based program.

2. Description of the Related Art

In recent years, GPU-CPU heterogeneous architectures have been increasingly adopted in high performance computing due to their capabilities of providing high computational throughput.

Modern GPUs employ a single instruction multiple data (SIMD) execution model that groups parallel threads executing the same instruction in lock-step. The group is called a warp in the NVIDIA GPU terminology and a wavefront in the AMD GPU terminology. However, a divergence may occur when threads that execute in lock-step are forced to take different program paths because of branches in a code. When branch divergence occurs, some threads have to wait or be idle while other threads are executing, and the divergent branches will be executed serially on GPUs. It can be seen that divergence causes serious performance degradation of GPUs.

Although much research focuses on the divergence issue, the divergence analysis for pointer-based programs has not been thoroughly looked into.

SUMMARY OF THE INVENTION

In one embodiment of the present invention, a computer-implemented divergence analysis method for a pointer-based program comprises generating an intermediate representation of a pointer-based program, wherein the intermediate representation is in gated single static assignment form, wherein, in one embodiment, the intermediate representation is in gated single static assignment and memory static assignment forms; providing a control flow graph of the intermediate representation; selecting a variable of the intermediate representation as an analysis candidate; using the analysis candidate as a traced variable and a root node; determining a definition site of the trace variable according to a corresponding use-define chain and the control flow graph; defining a node for each definition site variable of the definition site if the definition site of the traced variable does not comprise a predetermined built-in function; defining an edge by using each definition site variable of the definition site and the traced variable if the definition site of the traced variable does not comprise the predetermined built-in function; using each definition site variable of the definition site as a traced variable; repeating the steps of determining a definition site, defining a node, defining an edge, and using each definition site to obtain a divergence relation graph; transforming the divergence relation graph into a directed acyclic graph; identifying at least one divergent node of the directed acyclic graph; and determining whether the analysis candidate is divergent or not according to the at least one divergent node and the directed acyclic graph.

BRIEF DESCRIPTION OF THE DRAWINGS

The objectives and advantages of the present invention will become apparent upon reading the following description and upon referring to the accompanying drawings in which:

FIG. 1A shows a pointer-based program according to one embodiment of the present invention;

FIG. 1B shows an intermediate representation in SSA form according to one embodiment of the present invention;

FIG. 1C shows an intermediate representation in memory SSA form according to one embodiment of the present invention;

FIG. 1D shows an intermediate representation in memory SSA and gated SSA forms according to one embodiment of the present invention;

FIG. 4 shows an algorithm for building a divergence relation graph (DRG) according to one embodiment of the present invention;

DETAILED DESCRIPTION OF THE INVENTION

OpenCL (Open Computing Language) is a programming framework for programs operating on heterogeneous platforms including CPUs, GPUs, DSPs and other hardware accelerators. Although the present invention employs OpenCL, the present invention is not limited to employing OpenCL.

Table 1 shows two fragments of an exemplary OpenCL program according to one embodiment of the present invention.

TABLE 1

| Program fragment A | Program fragment B |
|---|---|
| int tid = get_global_id(0);<br>if (tid < N)<br>    x=0;<br>else<br>    x=1; | int tid = get_global_id(0);<br>while (tid < N)<br>    x++;<br>V[tid] = x; |

The program fragment A comprises an OpenCL built-in function, get_global_id( ), which returns different work-item IDs on different threads. Thus, the results of the conditions in if statements of some threads may be different from those of others, and consequently, divergence may happen. The OpenCL platform includes other built-in functions, such as get_local_id( ), atomic_add( ), atomic_sub( ), atomic_xchg( ), atomic_inc( ), atomic_dec( ), atomic_cmpxchg( ), atomic_ min( ), atomic_max( ), atomic_and( ), atomic_or( ), and atomic_xor( ), that may also cause divergence.

The x values of the program fragment B may be different between different threads since different tids cause different iteration numbers. As can be seen from the above examples, a variable is divergent if the value of the variable is computed from a built-in function, for example get_global_id( ); the variable that is data-dependent on a divergent variable is divergent; or the variable that is control-dependent on a divergent variable is divergent. Similarly, a pointer is divergent if the pointer points to a divergent variable.

In the present disclosure, the variable can be a character, integer, float, double or pointer variable.

The methods of at least some embodiments are based on two extended SSA (Static Single Assignment) forms: the memory SSA and gated SSA. Referring to FIGS. 1A to 1B, a pointer-based program, as shown in FIG. 1A, can be converted to an intermediate representation (IR) in SSA form, as shown in FIG. 1B. In the intermediate representation in SSA form, a statement, φ function, is used to represent a joining of all definitions of a variable. The φ function can be expressed as $V_k=\phi(V_m, V_n, \ldots, V_i)$, where $V_k$ denotes a new version of V and the operands on the right-hand side (RHS) denote the old versions of V.

The pointer-based program can be converted to an IR in memory SSA form, as shown in FIG. 1C. The IR of FIG. 1C uses two annotations or operators, May Use: μ and MayDef: χ to characterize the effects of aliasing. The functions μ and χ can be used to represent possible defs and uses. Each indirect store (e.g., *x=y) in an original program representation can be annotated with a function v=χ(v) for each variable v that may be defined by the store. Each indirect load (e.g., x=*y) in the original pointer-based program representation can be annotated with a function μ(v) for each variable v that may be accessed by the load. When converting to SSA form, each χ function is treated as both a def and use of the given variable, and each μ function is treated as a use of the given variable. As shown in FIG. 1C, p4 at line 19 may have aliases $a_1$ and $b_1$, and the IR includes $a_2=\chi(a_1)$ and $b_2=\chi(b_1)$, wherein $a_2=\chi(a_1)$ represents that the indirect store may define $a_1$ as a new version, $a_2$.

The gated SSA form enhances the φ function by applying control condition operands. The IR of FIG. 1D includes three gating functions γ, μ, and η to replace some φ functions.

The γ function adds a condition for multiple definitions to reach a confluence node that has no incoming back edges like the conditions in "if-then-else" statements. For instance, $x_3=\beta(P, x_1, x_2)$ represents $x_3=x_1$ if P, and $x_3=x_2$ if ¬P.

The μ function, which only exists at loop headers, selects initial and loop-carried values. For instance, $x_2=\mu(x_0, x_3)$ represents $x_2=x_0$ in the first iteration of a loop and $x_2=x_3$ after the first iteration of the loop.

The η function determines the value of a variable at the exit of the end of a loop. For instance, $x_4=\eta(P, x_3)$ represents that $x_3$ is the value assigned in the last iteration of a loop, and P is a condition to exit the loop.

In at least some embodiments, a revised gated SSA intermediate representation of FIG. 1D that can avoid naming conflict and handle loops having zero iteration is employed. In FIG. 1D, the statements at lines 16 and 17 use γ functions to replace η functions that supposedly should be used, and φ functions are used at lines 10 and 11 to replace μ functions that supposedly should be used.

Table 2 shows a statement or program classification according to one embodiment of the present invention.

TABLE 2

| | |
|---|---|
| Updated by Function | i=get_global_id(0),... |
| Points-to Location | p=&i, p=&A[i], p=A,... |
| Pointers Aliased | p = q + i, r = &p,... |
| Indirect Store | *p=..., p → ...=... |
| Indirect Load | ...=*q, ...=q→ ... |

In Table 2, p and q are one-level pointers; r is a two-level pointer; i is a scalar variable; and A is an array of scalar functions or variables.

A statement of an Updated by Function uses an OpenCL built-in function to return a value. A statement of a Points-to Location includes a pointer pointing to one or more locations. A statement of a Pointers Aliased includes an alias of pointers with an offset, or includes a one-level-higher pointer pointing to a one-level-lower pointer. A statement of Indirect Store and Indirect Load accesses pointers indirectly when a pointer is dereferenced by * or →. In at least some embodiments, the location naming is defined as (base, offset), and the offset can be composed of an affine style.

Figure 2:
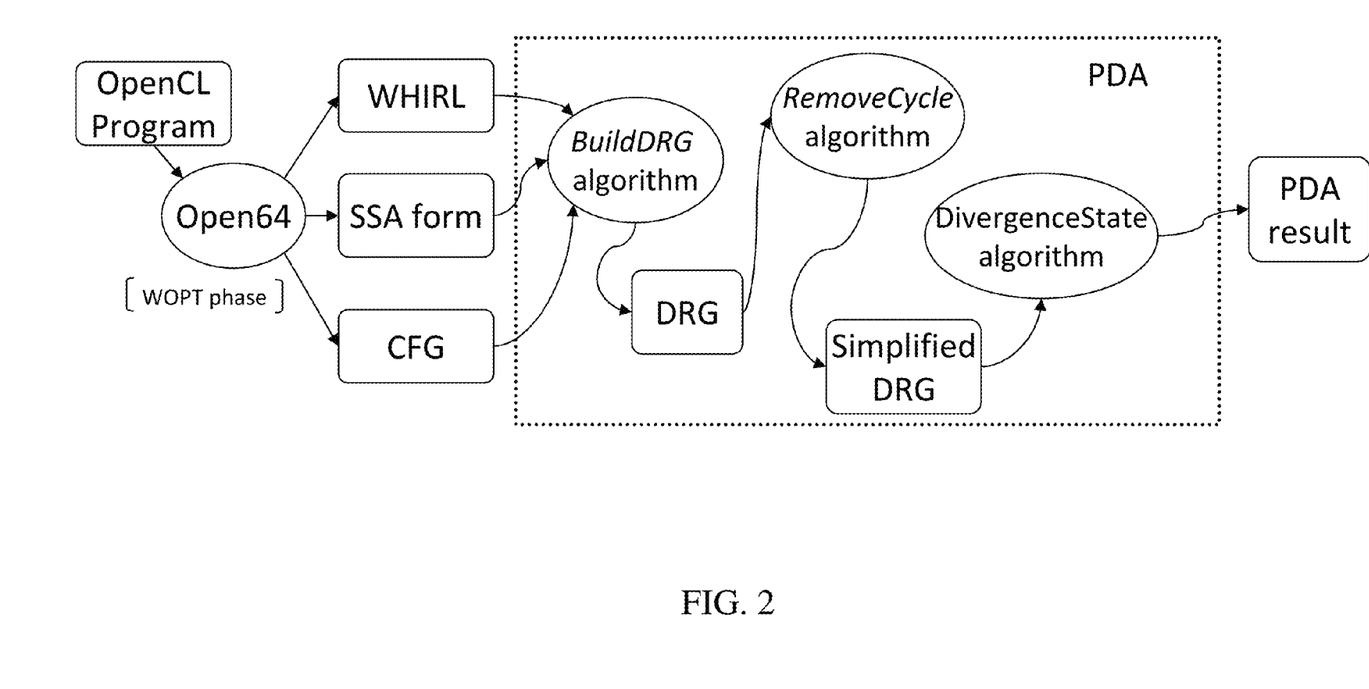
FIG. 2 is a flow diagram showing a pointer-based divergence analysis (PDA) method for a pointer-based program according to one embodiment of the present invention.
Figure 3:
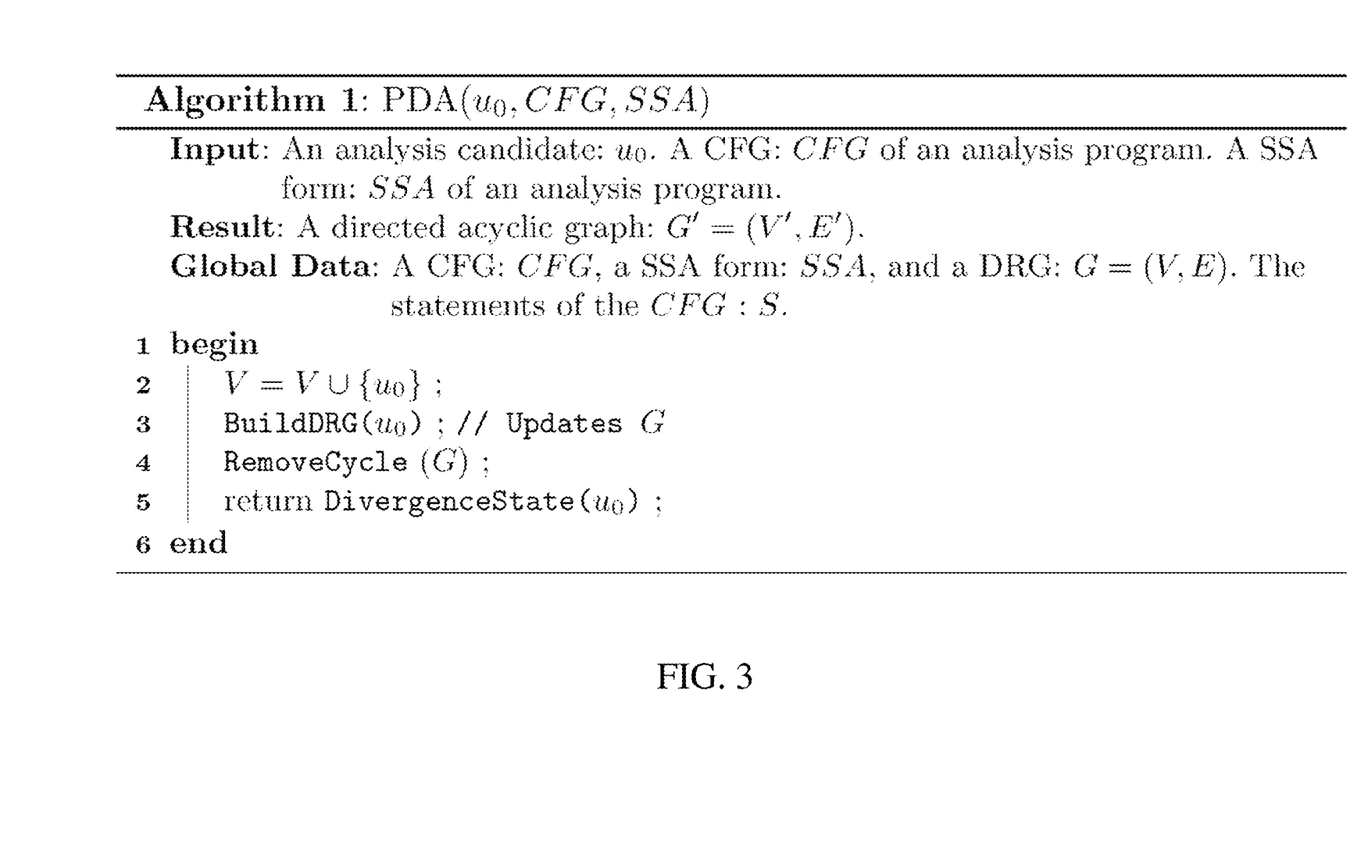
FIG. 3 shows an algorithm for a pointer-based divergence analysis (PDA) according to one embodiment of the present invention.

FIG. 2 is a flow diagram showing a pointer-based divergence analysis (PDA) method for a pointer-based program according to one embodiment of the present invention. FIG. 3 shows an algorithm for a pointer-based divergence analysis (PDA) according to one embodiment of the present invention. Referring to FIGS. 2 and 3, an OpenCL program, which is a pointer-based program, is initially provided; however, the application of the present invention is not limited to an OpenCL program.

A compiler, such as Open64, is used to compile the OpenCL program to generate a WHIRL intermediate representation, an intermediate representation in SSA form, and a CFG (control flow graph). However, the present invention is not limited to using Open64. In some embodiments, the intermediate representation in SSA form could be an intermediate representation in memory SSA. In some embodiments, the intermediate representation in SSA form could be an intermediate representation in gated SSA. In some embodiments, the intermediate representation in SSA form could be an intermediate representation in memory and gated SSA. In some embodiments, the intermediate representation in SSA form uses γ function to replace η function after a loop and uses φ function to replace μ function before a loop.

FIG. 4 shows an algorithm for building a divergence relation graph (DRG) according to one embodiment of the present invention. Referring to FIGS. 2 to 4, a pointer or other-type variable of the intermediate representation in SSA form is selected as an analysis candidate $u_0$. The analysis candidate $u_0$ is used to define a node and then pass to a function Build_DRG, as shown in lines 2 and 3 of FIG. 3, to build a divergence relation graph by using global data CFG and SSA.

Referring to FIG. 4, in the function Build_DRG, the pointers and other-type variables of a use-define or define-use chain of the analysis candidate $u_0$ are processed one after another to continuously update a global DRG: G in order to finally obtain a DRG after the updating process is completed. For each pointer or other-type variable u, a definition-site statement s is determined according to a use-define or define-use chain of the analysis candidate or traced variable $u_0$ and the CFG. In one embodiment, the global DRG: G is a directed cyclic graph G(V, E), and the root node of the DRG is the analysis candidate $u_0$; the leaf nodes may be the definition of the traced variable $u_0$ or points-to locations; and other nodes in the node set, V(G), are relevant pointers and variables of other types. E(G) connects the related pointers, locations, or variables between nodes of V(G).

Referring to FIG. 4, the function Build_DRG comprises functions BuildDRG_Chi, BuildDRG_Gating, BuildDRG_Callee, and BuildDRG_Mu. If the definition site or statement s includes a χ annotation, then the BuildDRG_Chi function is called.

Figure 5:
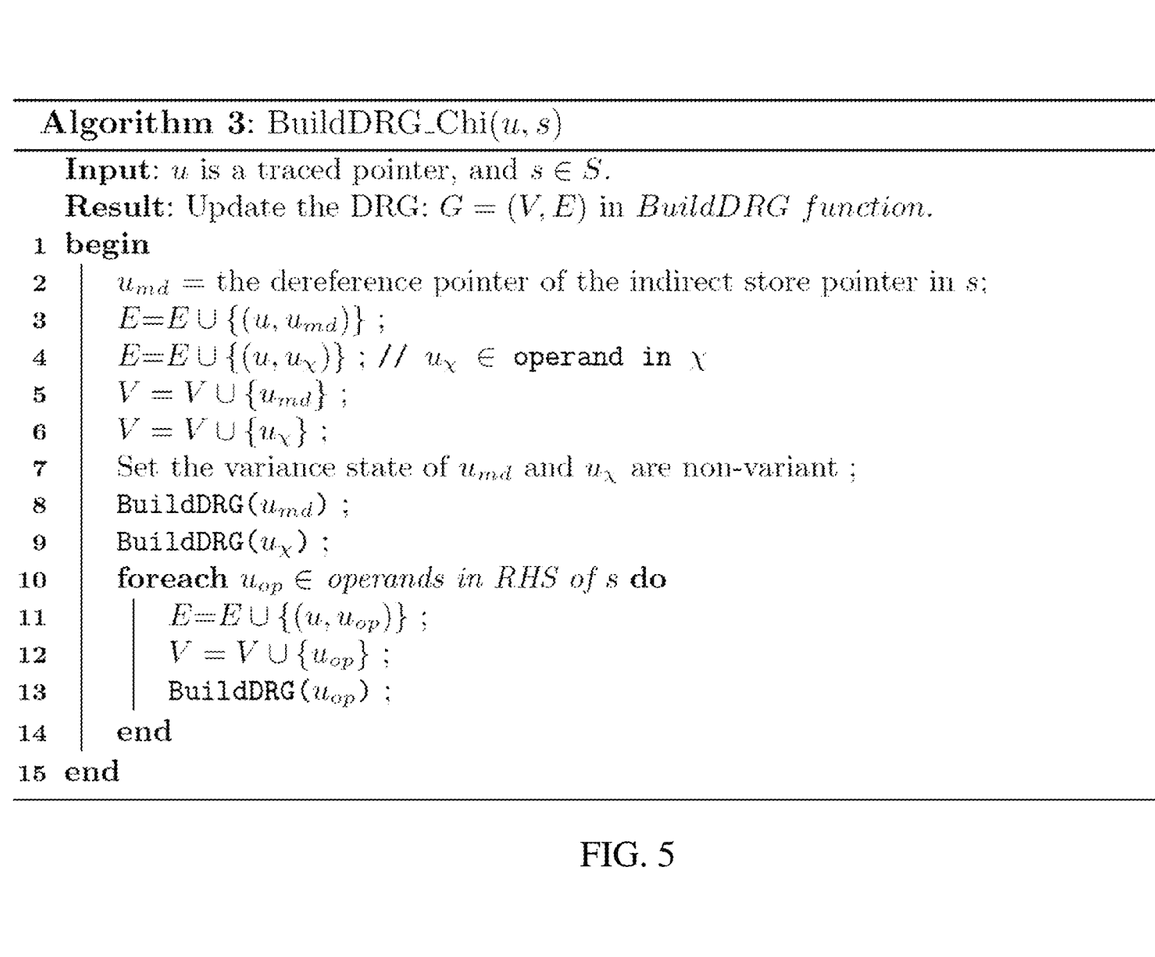
FIG. 5 shows an algorithm of a function BuildDRG_Chi according to one embodiment of the present invention.

Referring to FIG. 5, when the function BuildDRG_Chi is called, a deference pointer $u_{md}$ of an indirect store pointer in the statement s is determined. E(G) is updated by adding an edge defined by the traced pointer u and the deference pointer $u_{md}$, as shown in line 3 of FIG. 5. Next, E(G) is updated by adding an edge defined by the deference pointer $u_{md}$ and each operand $u_\chi$ in the χ function, as shown in line 4 of FIG. 5. Thereafter, a node for the deference pointer $u_{md}$ is used to update V(G), and a node for each operand in the χ function is used to update V(G). Then, variance states of the deference pointer $u_{md}$ and the operand(s) $u_\chi$ are set to be non-variant. Next, the deference pointer $u_{md}$ and the operand(s) $u_\chi$ are respectively passed to the function Build_DRG to continuously trace connections related to the statement s. Thereafter, an edge defined by each operand $u_{op}$ in the RHS (right hand side) of the statement s and the traced pointer u is added to E(G), and a node for each operand $u_{op}$ is added to V(G). Next, the variance state of each operand $u_{op}$ is set to be non-variant. Finally, each operand $u_{op}$ is passed to the function Build_DRG to continuously trace the connections related to the statement s.

Figure 6:
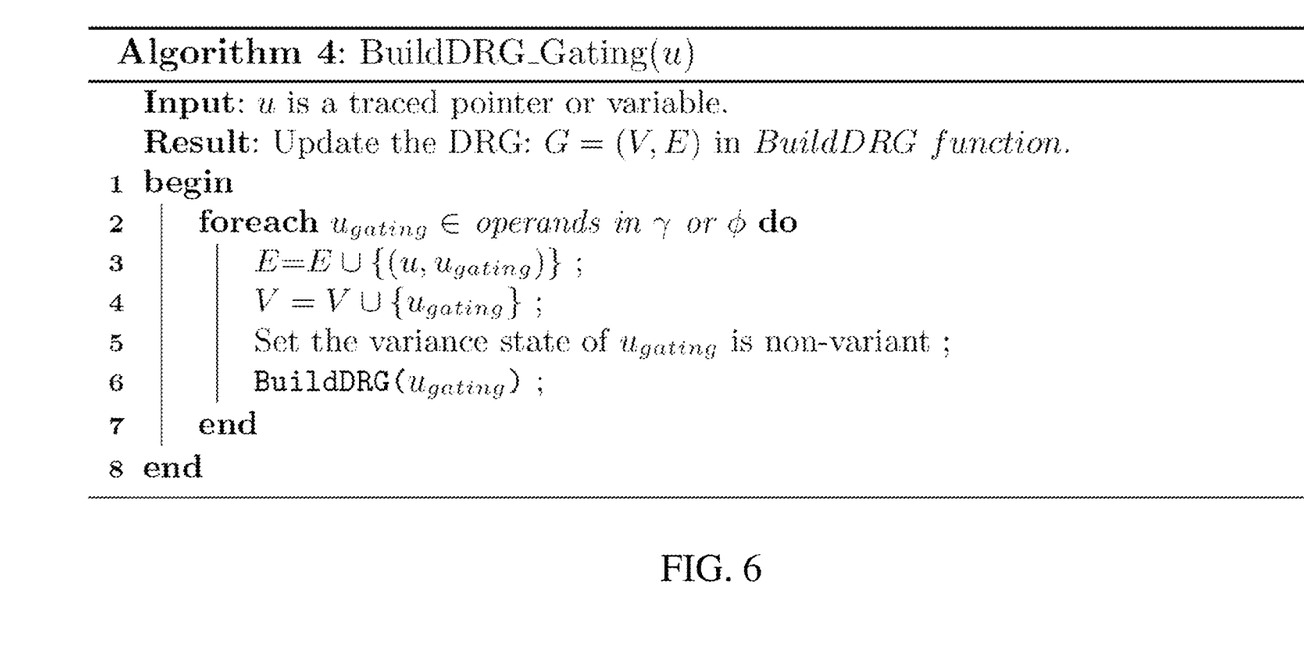
FIG. 6 shows an algorithm of a function BuildDRG_Gating according to one embodiment of the present invention.

Referring to FIGS. 4 and 6, the function BuildDRG_Gating is used when the statement s has at least one gating function. In at least some embodiments, all possible definition sites and control dependences that may cause divergence are analyzed so that all operands in γ and φ functions are traced and passed to the function Build_DRG.

Referring to FIG. 6, when the statement s includes a γ or φ function, the function BuildDRG_Gating is called. Each edge defined by each operand $u_{gating}$ in each γ or φ function and a traced pointer u is added to E(G). A node for each operand $u_{gating}$ in each γ or φ function is added to V(G). The variance state of each operand $u_{gating}$ in each γ or φ function of the statement s is set to be non-variant. Each operand $u_{gating}$ is passed to the function Build_DRG until all possible related pointers or other-type variables are exhausted.

Referring to FIG. 4, if the RHS of the statement s comprises at least one points-to location, an edge defined by a base address $u_{rb}$ of each location of the RHS of the statement s and the traced pointer or other-type variable u is added to E(G), and the base address $u_{rb}$ of each location is added to V(G). The offset $u_{offset}$ of the RHS of the statement s and the traced pointer or other-type variable u is added to E(G) and the offset $u_{offset}$ is added to V(G). The variance states of the base address $u_{rb}$ and the offset $u_{offset}$ are set to be non-variant, and the base address $u_{rb}$ and the offset $u_{offset}$ are respectively passed to the function Build_DRG. The location of the offset $u_{offset}$ can be obtained when it is passed to the function Build_DRG.

Referring to FIG. 4, if the statement s comprises at least one aliased pointer $u_{rb}$, an edge defined by the aliased pointer $u_{rb}$ and the traced pointer or other-type variable u is added to E(G) and a node for the aliased pointer $u_{rb}$ is added to V(G). An edge defined by a corresponding offset $u_{offset}$ of the aliased pointer $u_{rb}$ and the traced pointer or other-type variable u is added to E(G) and a node for the corresponding offset $u_{offset}$ of the aliased pointer $u_{rb}$ is added to V(G). The variance states of the aliased pointer $u_{rb}$ and the offset $u_{offset}$ are set to be non-variant. The aliased pointer $u_{rb}$ and the offset $u_{offset}$ are respectively passed to the function Build_DRG.

Figure 7:
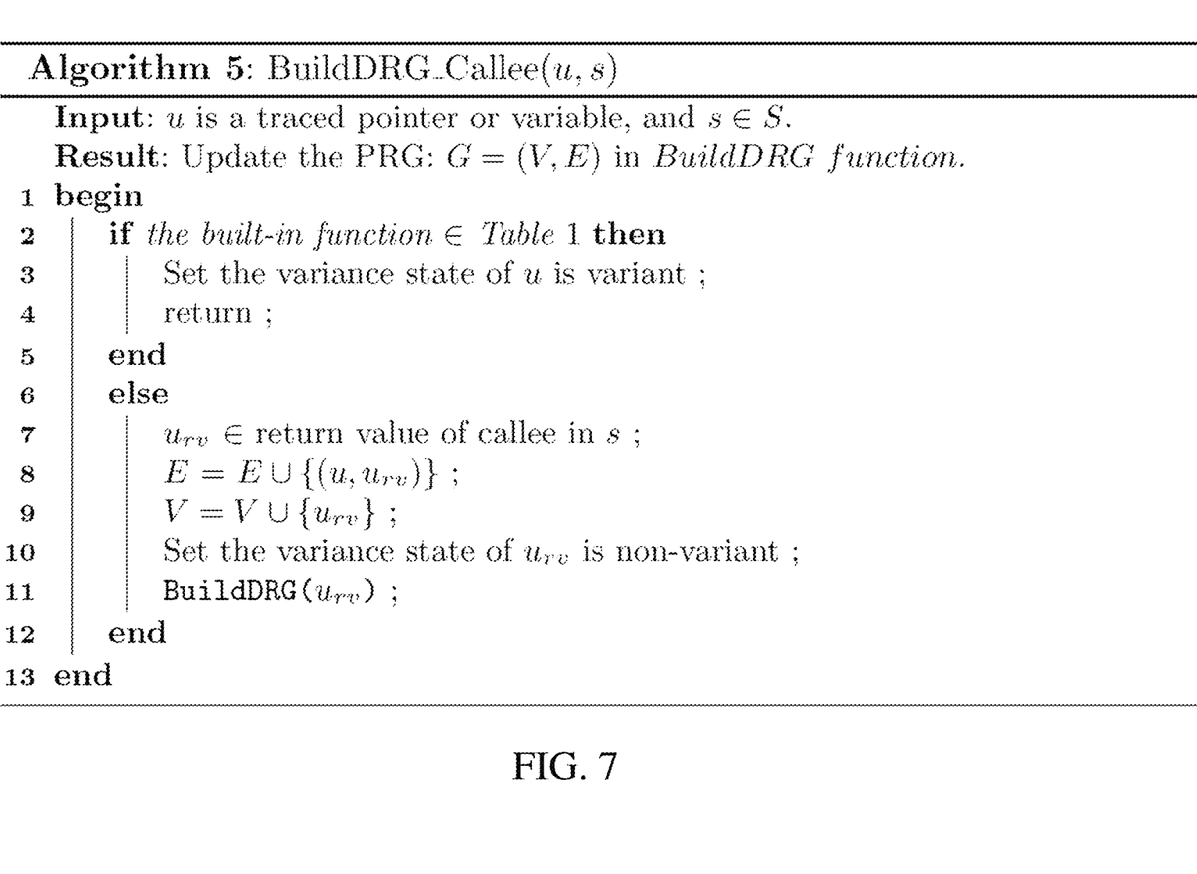
FIG. 7 shows an algorithm of a function BuildDRG_Callee according to one embodiment of the present invention.
Figure 8:
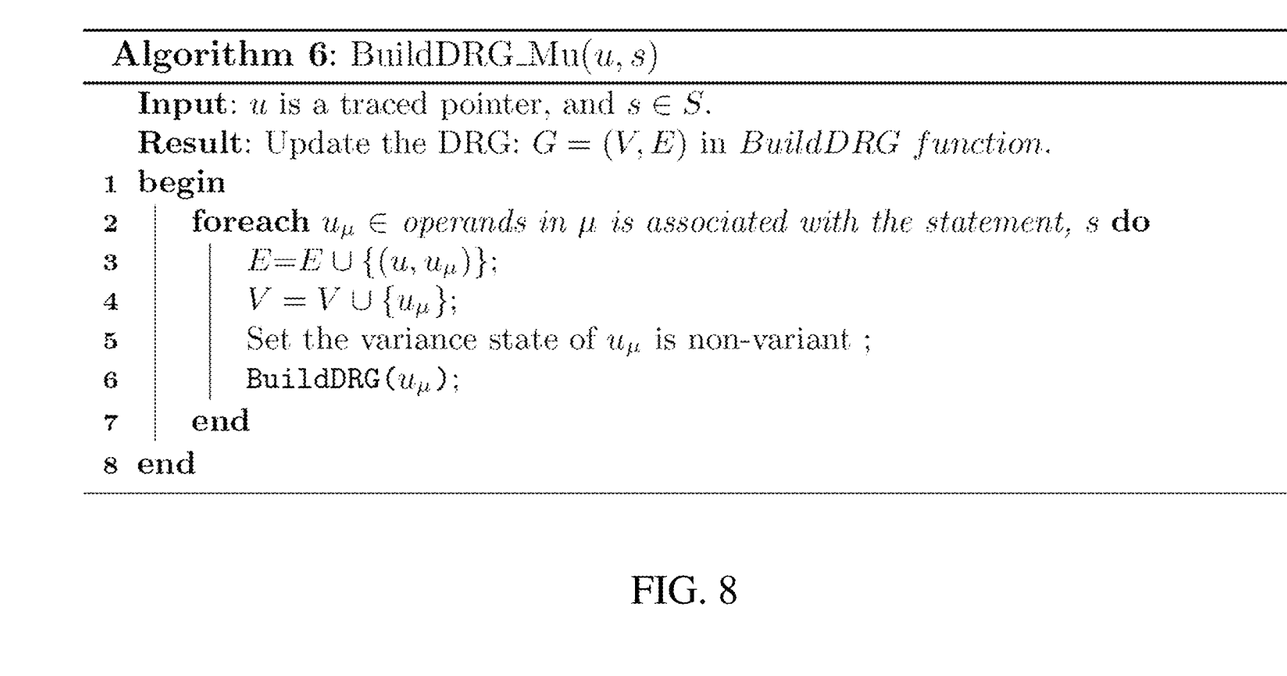
FIG. 8 shows an algorithm of a function BuildDRG_Mu according to one embodiment of the present invention.

Referring to FIGS. 4 and 7, when the statement s comprises an updating function classified as an Updated by Function, the function BuildDRG_Callee is called. The function BuildDRG_Callee will check whether the updating function is listed in the above Table 2 or it is not an OpenCL built-in function. If the updating function is one of the built-in functions of the above Table 2 or if it is not an OpenCL built-in function, the variant state of the pointer or other-type variable u is set to be variant or divergent; otherwise, the variant state is set to be non-divergent. If the updating function is not listed in the above Table 2, a node for a return value $u_{rv}$ of a callee (i.e., a called function) is added to V(G) and an edge defined by the return value $u_{rv}$ and the pointer or other-type variable u is added to E(G). The variance state of the return value $u_{rv}$ is then set to be non-variant. The return value $u_{rv}$ is passed to the function Build_DRG. Referring to FIGS. 4 and 8, when the statement s comprises an indirect load, the function BuildDRG_Mu is called. The function BuildDRG_Mu will trace all possible may-use variables in each μ function. An edge defined by each operand $u_\mu$ in each μ function and the pointer or other-type variable u is added to E(G) and a node for each operand $u_\mu$ is added to V(G). The variance state of each operand $u_\mu$ is set to be non-variant, and each operand $u_\mu$ is passed to the function Build_DRG.

Referring to lines 32 to 36 of FIG. 4, an edge defined by each operand $u_{op}$ in each scalar variable assignment of the RHS of the statement s and the traced pointer or other-type variable u is added to E(G). A node for each operand $u_{op}$ in each scalar variable assignment of the RHS of the statement s is added to V(G). The variance state of each operand $u_{op}$ in each scalar variable assignment is set to be non-variant. Each operand $u_{op}$ in each scalar variable assignment is passed to the function Build_DRG.

Figure 9A:
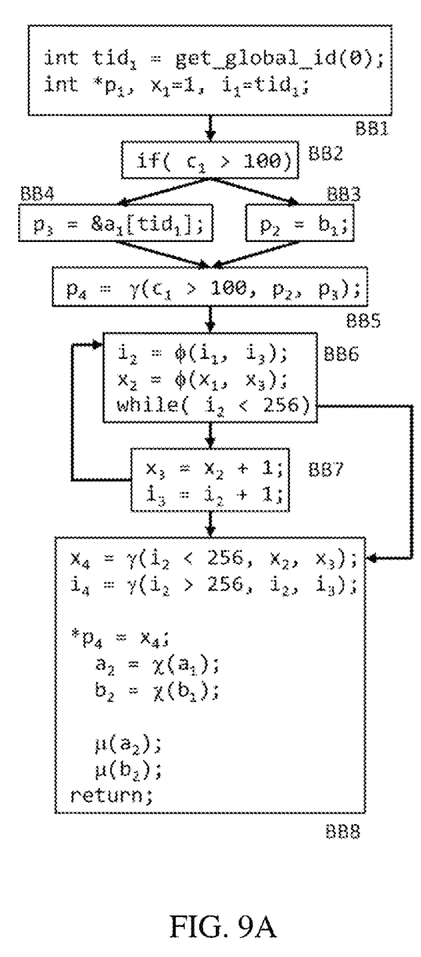
FIG. 9A shows a CFG of the IR of FIG. 1D.
Figure 9B:
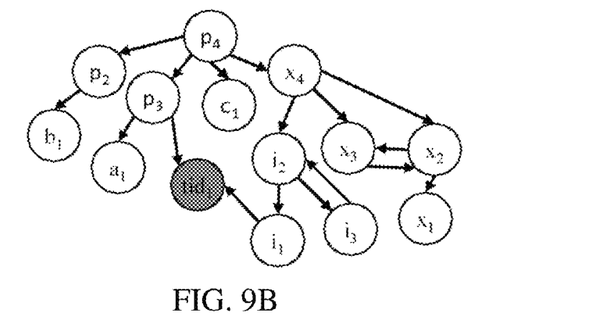
FIG. 9B shows a DRG according to one embodiment of the present invention.

FIG. 9A shows a CFG of the IR of FIG. 1D. FIG. 9B shows a DRG according to one embodiment of the present invention. Referring to FIGS. 9A and 9B, the DRG is produced after all related nodes are visited by the function Build_DRG. Each node is assigned a unique number by globally numbering each version of a variable in SSA. The following explains how to produce the DRG.

$p_4$ is selected as the analysis candidate and is passed to the function Build_DRG. Nodes for $p_2$, $p_3$ and $c_1$ are added and passed to the function Build_DRG because the definition site or statement of $p_4$ includes a γ grating function whose definition site variables or operands are $p_2$, $p_3$ and $c_1$ at BB5. The node $x_4$ is added and passed to the function Build_DRG because $x_4$ is in the RHS of the $p_4$ statement at BB8.

After $p_2$ is passed to the function Build_DRG, a statement including a definition site of $p_2$ is determined. According to the definition site of $p_2$ at BB3, the statement of the BB3 is classified as Pointer Aliased. Therefore, the definition site variable or aliased pointer $b_1$ is added and passed to the function Build_DRG. Since $b_1$ is the parameter of an analyzed function, which is defined in a host code, the definition site of $b_1$ can be found and this branch is terminated.

After $p_3$ is passed to the function Build_DRG, a statement including a definition site of $p_3$ is determined. According to the definition site of $p_3$, statement at BB4 is a Points-to location. The base address $a_1$ and the offsets $tid_1$, which are definition site variables and array indices, are added and passed to the function Build_DRG. Since the definition site of $a_1$ can be found, this branch is terminated.

After the function Build_DRG receives the offset $tid_1$, a statement, including a definition site of the offset $tid_1$ at BB1, is determined. Because the definition site of the offset $tid_1$ includes an update function get_global_id(0), which is an OpenCL C built-in function listed in the above Table 2, the function BuildDRG_Callee is called. The function BuildDRG_Callee sets the offset $tid_1$ to be divergent and returns.

After the function Build_DRG receives $x_4$, a statement at BB8, including definition site of $x_4$, is found. The definition site of $x_4$ includes a γ grating function. Thus, the definition site variables or operands $x_2$, $x_3$, and $i_2$ are added and passed to the function Build_DRG.

Because $x_2$ is defined by a φ function at BB6, only one node $x_1$ is added and passed to the function Build_DRG because $x_3$ has been visited.

The definition site of $x_3$ only includes a variable, $x_2$, which has been visited. Thus, the analysis is terminated.

The analysis of $x_1$ is terminated because a final definition is found.

The analyses of $i_1$, $i_2$, and $i_3$ are similar to those of $x_1$, $x_2$, and $x_3$, and therefore, redundant explanations are omitted. The final DRG is built as shown in FIG. 9B.

Figure 9C:
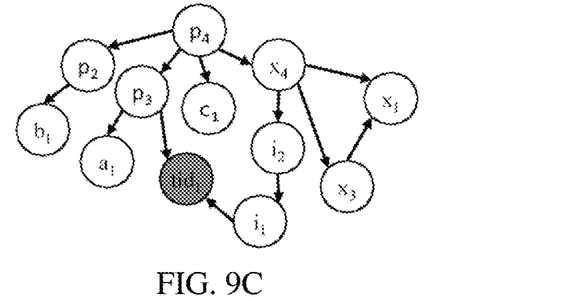
FIG. 9C shows a directed acyclic graph according to one embodiment of the present invention.

Referring to FIGS. 2, 3, 9C and 10, after the DRG is built, a function RemoveCycle is called. The function RemoveCycle transforms the DRG into a directed acyclic graph, as shown in FIG. 9C, by merging nodes that produce a cycle in the DRG. The cycle can be found by, for example, Tarjan's Algorithm, and the nodes of the cycle are merged to a cycle's root reported by the Tarjan's Algorithm. As shown in FIG. 9B, the DRG comprises two cycles. The first cycle comprises nodes $i_2$ and $i_3$. Supposing that $i_2$ is the cycle's root reported by the Tarjan's Algorithm, the edges ($i_2$, $i_3$) and ($i_3$, $i_2$) are removed and the node $i_3$ is eliminated after the variant state of the node $i_2$ is updated according to the variant state of the node $i_3$. The second cycle comprises $x_2$ and $x_3$. Supposing that $x_3$ is the cycle's root, an edge ($x_4$, $x_2$) is removed, and the edge ($x_3$ $x_2$) is removed. Next, the edge ($x_3$ $x_1$) is added and the edges ($x_2$, $x_3$) and ($x_3$ $x_2$) are removed. Finally, new variant states are computed after merging and the node $x_2$ is removed. A reduced DRG or directed acyclic graph is obtained as shown in FIG. 9C.

Figure 9D:
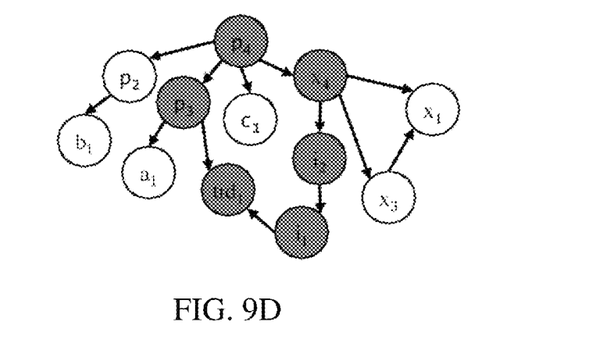
FIG. 9D shows the process for determining the state of $p_4$ according to one embodiment of the present invention.
Figure 10:
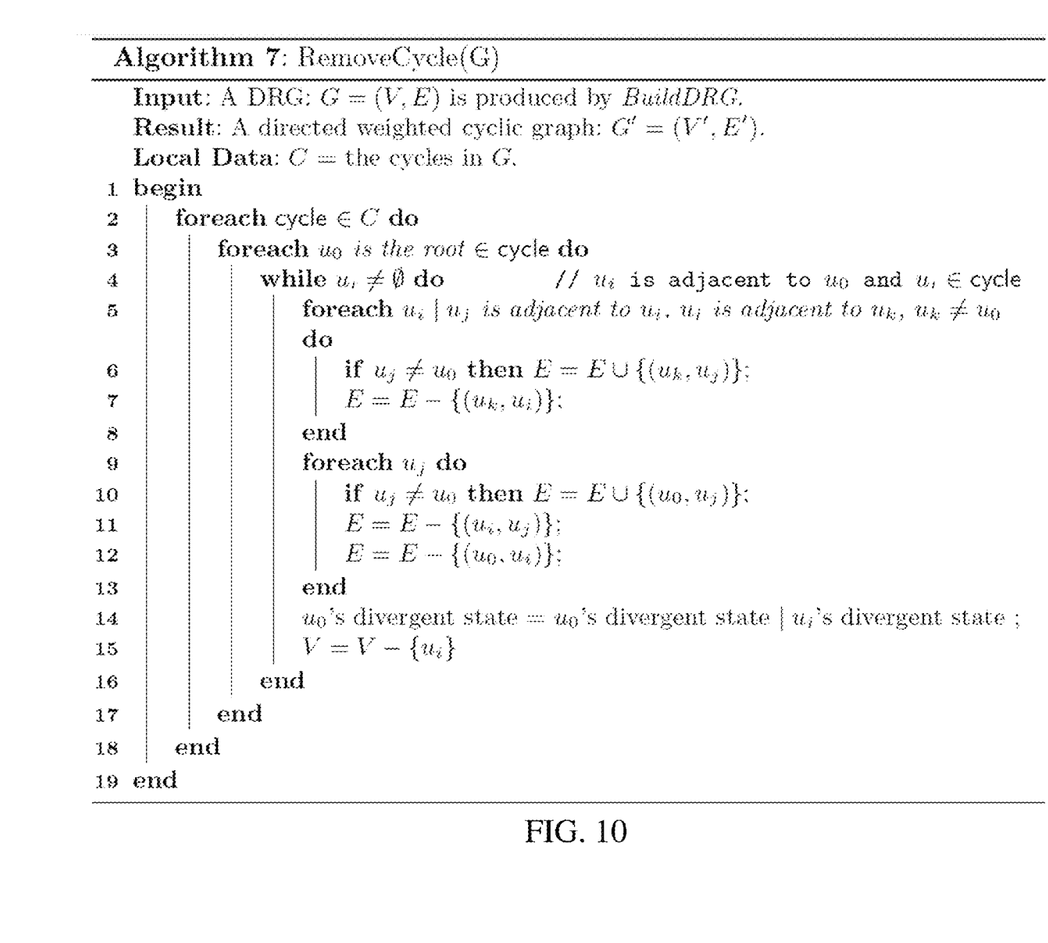
FIG. 10 shows an algorithm of a function RemoveCycle according to one embodiment of the present invention.
Figure 11:
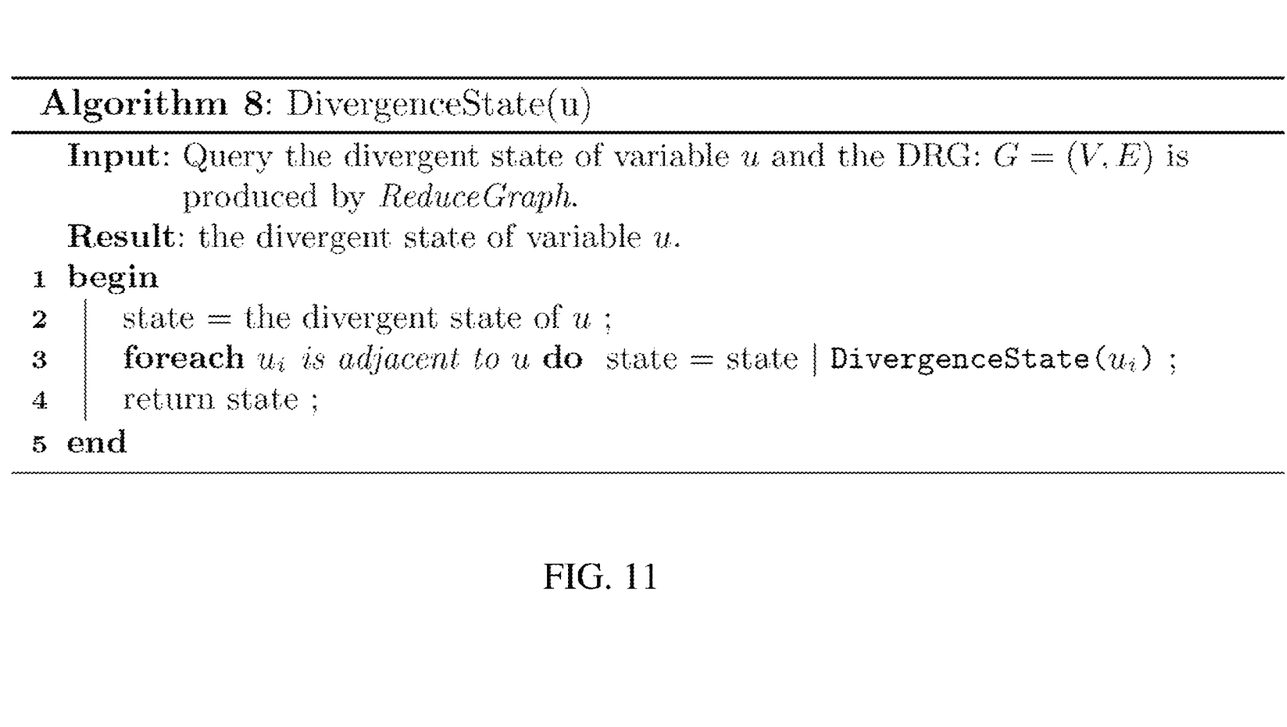
FIG. 11 shows an algorithm of a function DivergenceState according to one embodiment of the present invention.

Referring to FIGS. 2, 3, 9D and 11, a function DivergenceState is applied to compute the divergent state of the analysis candidate. The function DivergenceState performs an OR operation to all nodes in the reduced DRG except the root node. As shown in FIG. 9D, $tid_1$ is determined to be divergent because $tid_1$ is obtained by a built-in function. $p_3$ is divergent because $p_3$ is dependent on $tid_1$. Consequently, $p_4$ is divergent because it depends on $p_3$, which is divergent.

In one embodiment, the present invention comprises a hardware computer. The computer comprises a processor for executing each or every step of the methods of the above embodiments and a hardware memory for storing codes to cause the processor to execute each or every step of the methods of the above embodiments.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The above-described embodiments of the present invention are intended to be illustrative only. Those skilled in the art may devise numerous alternative embodiments without departing from the scope of the following claims.

What is claimed is:

1. A computer-implemented divergence analysis method for a pointer-based program, comprising:
   generating an intermediate representation of a pointer-based program, wherein the intermediate representation is at least in gated single static assignment form;
   providing a control flow graph of the intermediate representation;
   selecting a variable of the intermediate representation as an analysis candidate;
   using the analysis candidate as a traced variable and a root node;
   determining a definition site of the trace variable according to a corresponding use-define chain and the control flow graph;
   defining a node for each definition site variable of the definition site if the definition site of the traced variable does not comprise a predetermined built-in function;
   defining an edge by using each definition site variable of the definition site and the traced variable if the definition site of the traced variable does not comprise the predetermined built-in function;
   using each definition site variable of the definition site as a traced variable;
   repeating the steps of determining a definition site, defining a node, defining an edge, and using each definition site to obtain a divergence relation graph;
   transforming the divergence relation graph into a directed acyclic graph;
   identifying at least one divergent node of the directed acyclic graph; and
   determining whether the analysis candidate is divergent or not according to the at least one divergent node and the directed acyclic graph.

2. The divergence analysis method of claim 1, wherein the step of transforming the divergence relation graph into a directed acyclic graph comprises removing at least one cycle of the divergence relation graph.

3. The divergence analysis method of claim 1, wherein the intermediate representation uses a γ function for determining a value of a variable at an exit of an end of a loop.

4. The divergence analysis method of claim 1, wherein the intermediate representation uses a φ function at a loop header.

5. The divergence analysis method of claim 1, wherein the at least one divergent node comprises a variable determined by a function causing divergence.

6. The divergence analysis method of claim 1, wherein the steps of defining a node and defining an edge comprise:
   defining a node for a dereference pointer of an indirect store pointer in the definition site if the definition site comprises a χ function;

defining a node for each operand of the χ function;
defining an edge by using the dereference pointer and the trace variable;
defining an edge by using each operand of the χ function and the trace variable; and
setting the dereference pointer and each operand of the χ function to be non-variant.

7. The divergence analysis method of claim 6, further comprising:
defining a node for each operand in an RHS of the definition site; and
defining an edge by using each operand in the RHS of the definition site and the trace variable.

8. The divergence analysis method of claim 1, wherein the steps of defining a node and defining an edge comprise:
defining a node for each operand in each γ or φ function of the definition site;
defining an edge by using each operand in each γ or φ function and the trace variable; and
setting a variance state of each operand in each γ or φ function of the definition site to be non-variant.

9. The divergence analysis method of claim 1, wherein the steps of defining a node and defining an edge comprise:
defining an edge by using a base address of a location of the definition site and the trace variable;
defining a node for the base address;
defining an edge by using an offset corresponding to the base address and the trace variable;
defining a node for the offset; and
setting variance states of the base address and the offset to be non-variant.

10. The divergence analysis method of claim 1, wherein the steps of using a node and defining an edge comprise:
defining an edge by using an aliased pointer of the RHS of the definition site and the traced variable;
defining a node for the aliased pointer;
defining an edge by using an offset corresponding to the aliased pointer and the trace variable;
defining a node for the offset; and
setting variance states of the aliased pointer and the offset to be non-variant.

11. The divergence analysis method of claim 1, further comprises:
setting the traced variable to be non-variant if the definition site of the traced variable comprises a predetermined built-in function.

12. The divergence analysis method of claim 1, wherein the steps of using a node and defining an edge comprise:
defining a node for a return value of a callee in the definition site;
defining an edge by using the return value and the traced variable if the definition site of the traced variable does not comprise a predetermined built-in function; and
setting the return value to be non-variant.

13. The divergence analysis method of claim 1, wherein the steps of using a node and defining an edge comprise:
defining an edge by using each operand of a μ function of the definition site and the traced variable;
defining a node for each operand of the μ function; and
setting each operand of the μ function to be non-variant.

14. The divergence analysis method of claim 1, wherein the steps of using a node and defining an edge comprise:
defining an edge by using each operand in a scalar variable assignment of the RHS of the definition site and the traced variable;
defining a node for each operand in the scalar variable assignment of the RHS of the definition site; and
setting each operand in the scalar variable assignment of the RHS of the definition site to be non-variant.

15. The divergence analysis method of claim 1, further comprising setting each definition site variable to be non-variant.

16. A non-transitory tangible medium configured to store a program that enables a computer to execute a divergence analysis method comprising:
generating an intermediate representation of a pointer-based program, wherein the intermediate representation is at least in gated single static assignment form;
providing a control flow graph of the intermediate representation;
selecting a variable of the intermediate representation as an analysis candidate;
using the analysis candidate as a traced variable and a root node;
determining a definition site of the trace variable according to a corresponding use-define chain and the control flow graph;
defining a node for each definition site variable of the definition site if the definition site of the traced variable does not comprise a predetermined built-in function;
defining an edge by using each definition site variable of the definition site and the traced variable if the definition site of the traced variable does not comprise the predetermined built-in function;
using each definition site variable of the definition site as a traced variable;
repeating the steps of determining a definition site, defining a node, defining an edge, and using each definition site to obtain a divergence relation graph;
transforming the divergence relation graph into a directed acyclic graph;
identifying at least one divergent node of the directed acyclic graph; and
determining whether the analysis candidate is divergent or not according to the at least one divergent node and the directed acyclic graph.

* * * * *